Dec. 29, 1970     C. W. IBACH     3,550,308
SLUG OR BUG TRAP
Filed Jan. 29, 1969
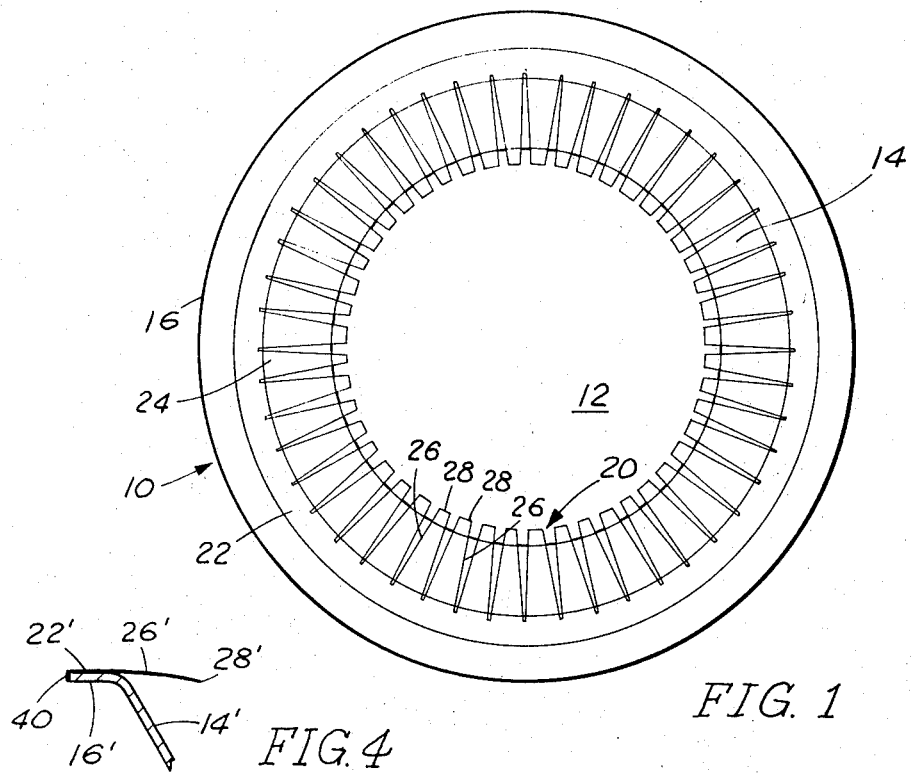
FIG. 1
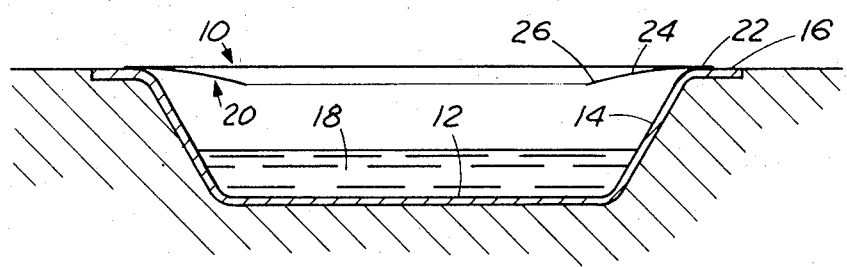
FIG. 4
FIG. 2
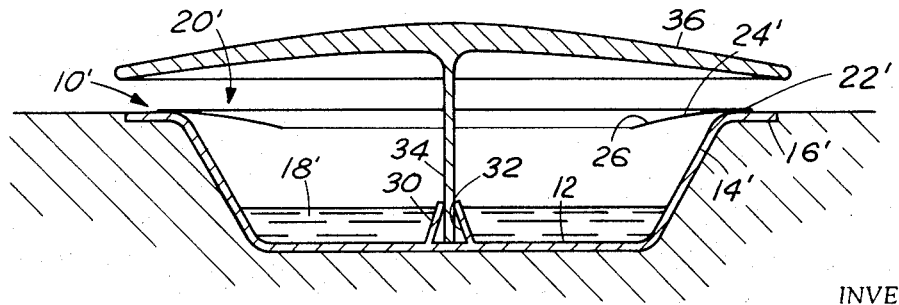
FIG. 3
INVENTOR.
CHARLES W. IBACH
BY
Christel & Bean
ATTORNEYS

United States Patent Office 3,550,308
Patented Dec. 29, 1970

3,550,308
SLUG OR BUG TRAP
Charles W. Ibach, 7198 Versailles Road,
Derby, N.Y. 14047
Filed Jan. 29, 1969, Ser. No. 794,924
Int. Cl. A01m 1/12
U.S. Cl. 43—121　　　　　　　　　　　　4 Claims

ABSTRACT OF THE DISCLOSURE

A trap for insects comprising a relatviely shallow basin for containing a substance poisonous to insects. A barrier in the form of an annular ring is secured at the top edge of the basin and has a portion consisting of a plurality of tongues extending radially inwardly from the top edge above the base of the basin to prevent escape of the poisoned insects from the basin.

BACKGROUND OF THE INVENTION

This invention relates to traps and, more particularly, to traps for capturing insects of the crawling type.

It is known to employ traps containing poisons for attracting and poisoning insects of the crawling variety, such as slugs, worms, snail, etc. Generally, the poisons employed are very strong and are objectionable because they can be harmful to human beings, animals, fowl, and birds. An attempt has been made to overcome this objection by employing mild poisonous substances of the type known as "paralyzing" insect concoctions, i.e. chemical preparations which are harmless to human beings, animals, birds, etc. but are slightly poisonous to insects and are capable of substantially disabling them until they perish. Since the reaction of these "paralyzing" compositions is slow, the insects very often are able to escape from the trap to perish and decay in other areas creating undesirable odors and uncontrolled contamination.

SUMMARY OF THE INVENTION

Accordingly, it is an object of the present invention to provide an improved trap for collecting and exterminating insects.

It is another object of this invention to provide the foregoing with means for preventing the escape of insects from the trap.

It is still another object of this invention to provide an improved insect trap which is simple in construction, easy to manufacture, and low in cost.

The foregoing and other objects, advantages and characterizing features of the present invention will become clearly apparent from the ensuing detailed description of an illustrative embodiment thereof, taken together with the accompanying drawing wherein like reference numerals denote like parts throughout the various views.

BRIEF DESCRIPTION OF THE DRAWING

FIG. 1 is a top plan view of the trap of the persent invention;

FIG. 2 is a vertical sectional view of the trap of FIG. 1;

FIG. 3 is a vertical sectional view of another form of this invention; and

FIG. 4 is a fragmentary sectional view of another form of the present invention.

DESCRIPTION OF ILLUSTRATIVE EMBODIMENTS

Referring to FIGS. 1 and 2 of the drawings, there is shown an illustrative embodiment of a trap of the present invention comprising a basin, generally designated 10, having a circular base 12 and a side wall 14 extending about the peripheral edge of base 12. Side wall 14 is inclined upwardly and outwardly away from base 12 and terminates in a circular flange 16 extending radially horizontally away from the upper edge of side wall 14. The body of basin 10 is relatively shallow and is adapted to receive a liquid bait 18 which is attractive and poisonous to insects but harmless to human beings, animals, and birds. The composition of the poisonous bait forms no part of this invention and can be in the form of a glutinous or sticky composition, or in the form of a powder or bulky solid, if desired.

A significant feature of this invention is the provision of means for preventing escape of insects from basin 10, such means comprising a barrier ring, generally designated 20, having a rim portion 22 secured to the upper surface of flange 16 and a lip portion 24 projecting radially inwardly of the upper edge of side wall 14. Barrier ring 20 is formed of a thin, lightweight, resiliently flexible material, such as transparent cellophane for example. Lip 24 comprises a plurality of elongated, longitudinally tapered tongues 26 terminating in flat edges 28. The resiliency of the material of which barrier ring 20 and thereby tongues 26 are formed causes these tongues to bend or yield under the weight of any insects crawling thereon. The slots or openings between tongues 26 permit the circulation of air therethrough to expel the attractive odor of bait 18 into the ambient atmosphere thereby enticing insects in the surrounding area.

In use, the trap is inserted into a ground surface as shown in FIG. 2 so that the upper surface of flange 16 is flush with the ground surface and basin 10 is filled with bait 18 to the level desired. Insects of the crawling variety are lured to the trap by bait 18 and slip over tongues 26 into basin 10. After consuming a portion of the poisonous bait which stupifies and partially disables the insects, they tend to crawl up inclined side wall 14 to leave the trap. However, they will be prevented from doing so by the overhanging barrier of lip portion 24 and will be trapped within the confines of basin 10 until they perish.

FIG. 3 illustrates another form of the trap of this invention which is very similar to the form described above with the exception that means are provided for preventing dilution of the bait from water due to precipitation or a sprinkler system for example. The other structural features of the trap of FIGS. 1 and 2 and their attendant functions are duplicated in the second form of the invention and the same numbers primed are used to identify similar elements. Such protection means comprises an upstanding support member 30 integral with or rigidly attached to base 12 and having a restricted opening 32 adjacent the top thereof for receiving the stem 34 of a canopy or umbrella-like cover 36. Cover 36 extends radially outwardly beyond the upper edge of side wall 14 and is vertically spaced therefrom to provide an entrance opening for the insects. If desired, cover 36 may be fixedly secured to basin 10 and constitute a unitary construction therewith. However, cover 36 is preferably removable as shown in FIG. 3, to facilitate the placement of bait 18 in basin 10 and the removal of dead insects therefrom. This form of the invention has the advantage of sheltering or protecting the bait against dilution from rain water or water being discharged from a hose or sprinkler above the trap.

FIG. 4 illustrates another form of barrier ring for the tap, said ring having a lip portion and a plurality of elongated, longitudinally tapered tongues 26′ terminating in flat edges 28′ in a construction identical to that shown in FIGS. 1 and 2. The barrier ring differs from that of the embodiment first described by providing a rim portion 22′ which overlies and extends over the entire upper surface of flange 16′ and terminates in a depending skirt portion 40 which fits snugly over the peripheral or marginal edge of flange 16′. The advantage residing in this form of the invention is that the modified barrier ring is removable after use so that the accumulation of dead insects and the contaminated bait can be readily removed and the trap easily cleaned for reuse.

From the foregoing it is apparent that the objects of the present invention have been fully accomplished. As a result of this invention, an improved trap is provided for enticing, collecting, and exterminating insects. By the provision of a barrier means at the top of the trap, the insects remain entrapped until they perish thereby preventing decay of such insects and contamination thereby on other ground areas.

Preferred illustrations of the principles of this invention having been described and illustrated, it is to be realized that modifications thereof can be made without departing from the broad spirit and scope of this invention as defined in the appended claims.

I claim:

1. An insect trap for use with an insect poison comprising: a basin adapted to be embedded in a ground surface; said basin having a base and a side wall terminating in an upper edge disposable flush with said ground surface and defining an opening; an annular barrier means having a first portion secured to said upper edge of said side wall and a second portion projecting inwardly of said upper edge and spaced above said base; said barrier means being formed of a relatively thin, lightweight, resiliently flexible material; said second portion of said barrier means comprising a plurality of elongated tongues bendable under the weight of an insect crawling thereon.

2. An insect trap according to claim 1 wherein said material forming said barrier means is cellophane.

3. An insect trap according to claim 1 including cover means spaced from said opening of said basin.

4. An insect trap according to claim 3 wherein said cover means comprises a canopy located above said opening and extending radially outwardly beyond said upper edge of said side wall, said canopy having an outer edge spaced above said upper edge of said basin to provide an annular opening leading to said basin.

References Cited

UNITED STATES PATENTS

| 200,574 | 2/1878 | Schreiber et al. | 43—65X |
| 2,239,937 | 4/1941 | Smith | 43—131 |

FOREIGN PATENTS

| 79,498 | 2/1895 | Germany | 43—121 |
| 12,973 | 1899 | Great Britain | 43—121 |
| 13,531 | 1894 | Great Britain | 43—121 |

WARNER H. CAMP, Primary Examiner

U.S. Cl. X.R.

43—131